US012072480B2

(12) United States Patent
Kang et al.

(10) Patent No.: US 12,072,480 B2
(45) Date of Patent: Aug. 27, 2024

(54) SCAN-LESS CONFOCAL MICROSCOPE WITH HIGH RESOLUTION RELATED APPLICATIONS

(71) Applicant: Arizona Board of Regents on Behalf of the University of Arizona, Tucson, AZ (US)

(72) Inventors: Dongkyun Kang, Tucson, AZ (US); Cheng Gong, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 545 days.

(21) Appl. No.: 17/419,921

(22) PCT Filed: Jan. 17, 2020

(86) PCT No.: PCT/US2020/014108
§ 371 (c)(1),
(2) Date: Jun. 30, 2021

(87) PCT Pub. No.: WO2020/150615
PCT Pub. Date: Jul. 23, 2020

(65) Prior Publication Data
US 2022/0066186 A1    Mar. 3, 2022

(51) Int. Cl.
*G02B 21/00* (2006.01)
*G01J 3/28* (2006.01)
*G02B 21/02* (2006.01)

(52) U.S. Cl.
CPC ............ *G02B 21/0032* (2013.01); *G01J 3/28* (2013.01); *G02B 21/02* (2013.01)

(58) Field of Classification Search
CPC .... G02B 21/0032; G02B 21/02; G02B 21/00; G02B 21/0004; G02B 21/002;
(Continued)

(56) References Cited

U.S. PATENT DOCUMENTS 9,733,460 B2    8/2017  Kang et al.
2004/0065845 A1*  4/2004  Seyfried .............. G02B 21/008
                                                        250/458.1
(Continued)

FOREIGN PATENT DOCUMENTS

KR      101832616 B1  *  2/2018
WO      2017223206 A1    12/2017

OTHER PUBLICATIONS

International Search Report and Written Opinion for International Patent Application No. PCT/US2020/014108 (9 pages).

*Primary Examiner* — Arnel C Lavarias
(74) *Attorney, Agent, or Firm* — Perkins Coie, LLP (57) ABSTRACT

Devices, systems and methods are described that can be used to develop confocal microscopes with high lateral resolution. One example confocal microscope includes a first dispersion element that receives a light beam and to produce illumination beams with different spectral components, and an objective that receives reflected light upon reflection of the illumination beams from a target. The confocal microscope further includes a second dispersion element that receives the reflected light after propagation through in the objective lens, and a third dispersion element that receives the dispersed light associated with the second dispersion element and provides an output light to a camera lens for focusing onto a detector. The second and the third dispersion elements are positioned such that each point on the detector is conjugate to a corresponding single point on the target. Some applications of the disclosed confocal microscopes include skin disease diagnosis and imaging of freshly-excised tissues.

21 Claims, 5 Drawing Sheets

(58) Field of Classification Search
CPC ............ G02B 21/0024; G02B 21/0036; G02B 21/004; G02B 21/0052; G02B 21/0064; G02B 21/06; G02B 21/36; G02B 21/361; G02B 5/18; G02B 2005/1804; G02B 5/1842; G02B 5/1866; G02B 27/42; G02B 27/4205; G02B 27/4227; G02B 27/4272; G02B 27/4277; G02B 27/4294; G02B 27/44; G01J 3/28
USPC ....... 359/368, 362, 363, 369, 385, 558, 566, 359/569
See application file for complete search history.

(56) References Cited

U.S. PATENT DOCUMENTS

| | | |
|---|---|---|
| 2006/0072189 A1 | 4/2006 | Dimarzio et al. |
| 2007/0241266 A1* | 10/2007 | Gweon .............. G02B 21/0032 250/225 |
| 2011/0261367 A1 | 10/2011 | Gmitro et al. |
| 2013/0286181 A1 | 10/2013 | Betzig et al. |
| 2016/0202178 A1 | 7/2016 | Acosta et al. |
| 2016/0334610 A1 | 11/2016 | Kang et al. |

* cited by examiner

SCAN-LESS CONFOCAL MICROSCOPE WITH HIGH RESOLUTION RELATED APPLICATIONS

STATEMENT REGARDING FEDERALLY SPONSORED RESEARCH

This invention was made with government support under Grant No. R21 TW010221, awarded by National Institutes of Health. The government has certain rights in the invention.

RELATED APPLICATIONS

This patent document is a 371 National Phase Application of International Patent Application No. PCT/US2020/014108, filed Jan. 17, 2020, which claims priority to the provisional application with Ser. No. 62/794,243, titled "Scan-Less Confocal Microscope with High Resolution," filed Jan. 18, 2019, and provisional application with Ser. No. 62/795,349, titled "Scan-Less Confocal Microscope with High Resolution," filed Jan. 22, 2019. The entire contents of the above noted applications are incorporated by reference as part of the disclosure of this document.

TECHNICAL FIELD

The subject matter of this patent document relates generally to confocal microscopy, and in particular to confocal microscopy methods and systems that produce images with enhanced resolution.

BACKGROUND

Since its invention in the 1950s, confocal microscopes have been extensively investigated to provide better imaging performance for applications that range from metrology to tissue imaging. In its basic configuration, a confocal microscope is a point imaging system that includes a pinhole to block out the light outside of the focused spot before reaching a detector. Over the years, many variations and improvements to the original confocal microscope have been proposed and implemented. Yet, there is still a need to produce low-cost and compact confocal microscopes with improved resolution.

SUMMARY OF CERTAIN EMBODIMENTS

The confocal microscopes developed based on the disclosed technology greatly improve clinical utility of the confocal microscopy technology and, among other features and benefits, facilitate disease diagnosis. The disclosed embodiments can, for example, be used to develop low-cost confocal microscopes for skin disease diagnosis and imaging of freshly-excised tissues with high lateral resolution.

One aspect of the disclosed embodiments relates to a confocal microscope that includes a first dispersion element positioned to receive a light beam and to produce illumination beams having different spectral components for illumination of a target, and an objective lens positioned to receive reflected light from the target upon reflection of the illumination beams from the target. The confocal microscope further includes a second dispersion element positioned to receive the reflected light after propagation through the objective lens, and a third dispersion element positioned to receive the dispersed light associated with the second dispersion element and to provide an output light to a camera lens for focusing onto a detector. The second and the third dispersion elements are positioned such that each point on the detector is conjugate to a corresponding single point on the target.

DETAILED DESCRIPTION

Figure 1A:
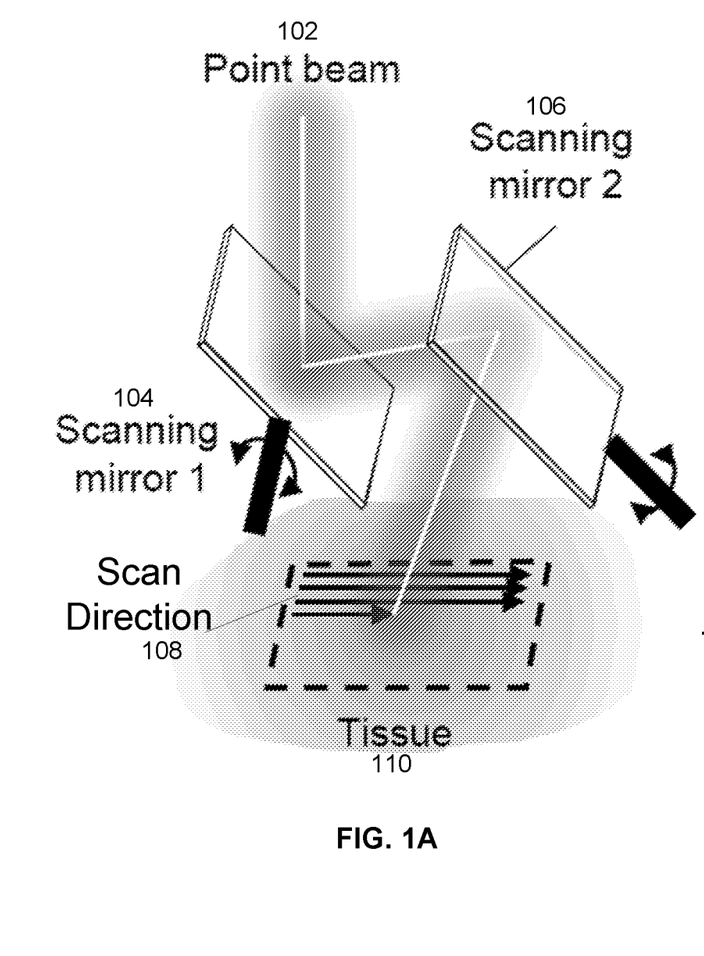
FIG. 1A illustrates an example conventional confocal microscope.
Figure 1B:
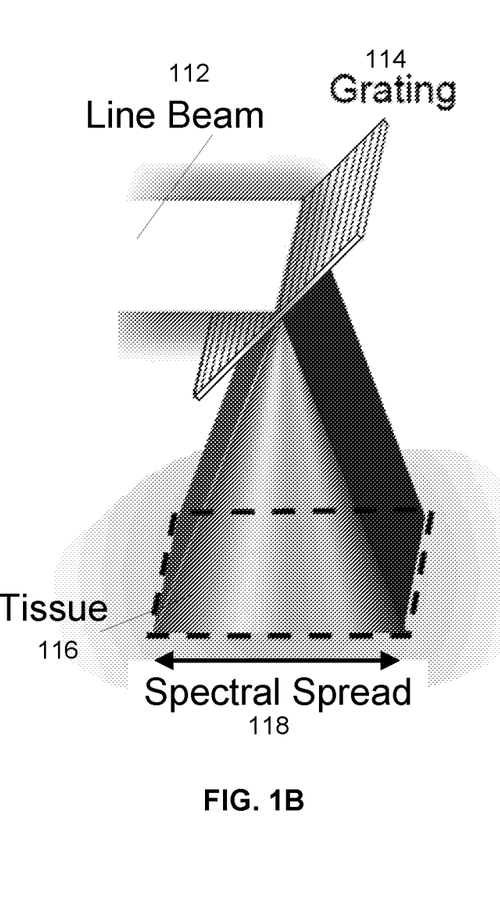
FIG. 1B illustrates another example of a conventional confocal microscope.

FIG. 1A illustrates an example conventional confocal microscope. In the configuration of FIG. 1A, the tissue or object of interest 110 is scanned (e.g., in the direction shown by arrows 108) by a point beam 102 using scanning mirror 1 (104) and scanning mirror 2 (106), or generally via beam scanning devices such as galvo scanners and polygon mirrors, to obtain two-dimensional confocal images. FIG. 1B illustrates another example conventional confocal microscope. An improvement over the configuration of FIG. 1A is shown as a scan-less confocal microscope in FIG. 1B, in which a diffraction grating 114 receives a line beam 112 and produces diffracted output light having a spectral spread 118 to effectuate spatial scanning of the object 116 and to obtain two dimensional confocal images without having to use any beam scanning devices.

Figure 2:
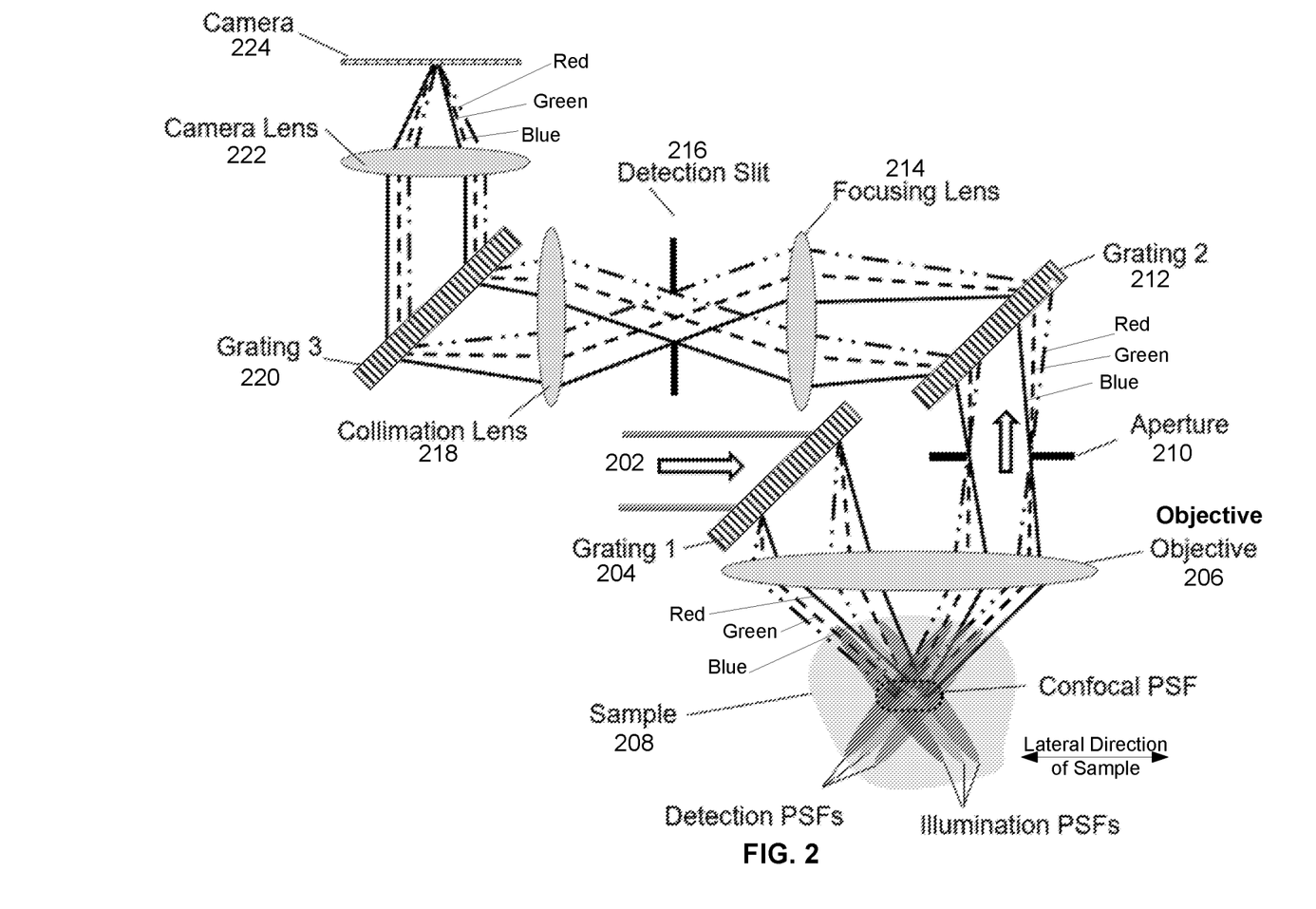
FIG. 2 illustrates an example of a scan-less confocal microscope.

Another scan-less confocal microscope is shown in FIG. 2. In this approach, a broadband light source (e.g., an LED) (not shown) is used to provide a collimated broadband light 202 to illuminate grating 1 (204) that effectuates the scanning. In some configurations, the light source is a white light source with an illumination slit placed and a collimating lens in front of the light source to produce a line source, which is subsequently incident on the diffraction grating 1 (204). The light after passing through an objective lens 206 illuminates the sample 208. Each line on the sample is illuminated with a distinctive wavelength. The reflected light from the sample is collected by the same objective lens 206, may pass through an aperture 210, be diffracted by grating 2 (212), pass through a focusing lens 214 that focuses the light on the detection slit 216. Light after the detection slit 216 is collimated by the collimation lens 218, diffracted by grating 3 (220), and focused by the camera lens 222 on the camera 224. The camera 224 (or generally a detector, e.g., a CCD or CMOS detector) is positioned at the focal plane of the camera lens 222 to receive the focused light. The aperture 210 between the objective lens 206 and grating 2 (212) can limit the spatial extent of the light that is collected by the detection system. In the diagram of FIG. 2, solid, dashed and dashed-dotted lines are used to respectively illustrate the blue, green and red light rays. It is understood that the spectral extent of the light that is used to scan the object depends on several factors including the spectral contents of the light source and the diffraction grating.

The configuration in FIG. 2 provides a scan-less confocal microscope, in which a line beam 202 with a broad spectrum can be diffracted by a diffraction grating 204 to conduct two-dimensional confocal imaging. Since inexpensive components such as LEDs and consumer-grade CMOS imaging sensors can be used to construct the confocal microscope, the device cost can be reduced significantly, which can improve the clinical adaptation of the device. In one implementation, the scan-less, smartphone-based confocal microscope can be produced with the material cost of about $4,200, which is significantly lower than the commercial confocal microscopes (device cost >$65,000). Using such a scan-less, smartphone confocal microscope, cellular imaging of human skin can be performed in vivo. In this configuration, however, the grating arrangement is not optimized in that lateral resolution of the obtained images degrades as the width of the detection slit is increased. An increased slit width is preferred or even mandated in certain cases where the signal level from the sample (e.g., the tissue) is low and/or the speckle noise is prominent.

To further illustrate this shortcoming, it is instructive to note that for each pixel of the camera in FIG. 2, multiple wavelengths contribute towards the detected signal intensity. The light beams incident on a particular pixel can be back-traced to the sample to reveal the detection point-spread functions (PSFs). Confocal PSF for each wavelength is the product of the illumination PSF and detection PSF for each wavelength, and the overall confocal PSF for multiple wavelengths is the sum of the confocal PSFs for all the wavelengths detected by the particular pixel. FIG. 2 includes an illustration of the detection, the illumination and the confocal PSFs. In the configuration of FIG. 2, gratings 2 (212) and grating 3 (220) are configured in such a way that the particular pixel of the camera is not conjugate to a single point on the sample side but is spread out to multiple points. Therefore, the overall confocal PSF becomes wide along the lateral direction (see the dotted ellipse in FIG. 2). This poses a challenge because 1) one of the key advantages of confocal microscopy is its high lateral resolution and 2) confocal images are often generated en face—facing the object that you are looking at, where any degradation of the lateral resolution can adversely affect the quality of diagnostic information that the confocal image can provide.

Figure 3:
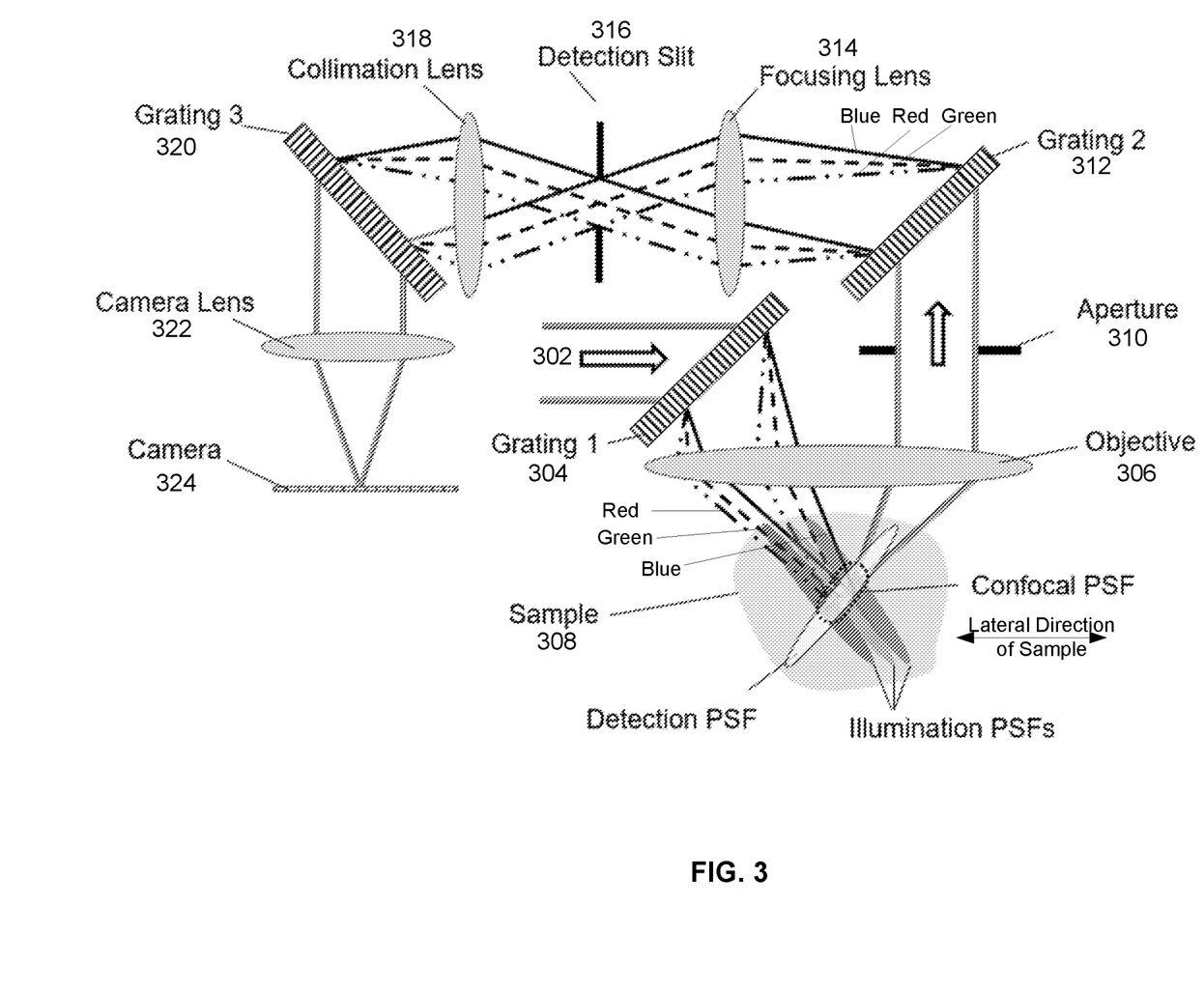
FIG. 3 illustrates a scan-less confocal microscope with an improved lateral resolution.

FIG. 3 illustrates an example scan-less confocal microscope that, among other features and benefits, provides an improved lateral resolution compared to the configuration of FIG. 2. The components depicted in FIG. 3 are similar to those in FIG. 2. In particular, a collimated light 302 illuminates grating 1 (304) that after passing through an objective lens 306 illuminates the sample 308 similar to FIG. 2. The reflected light from the sample 308 is collected by the same objective lens 306, and after passing through aperture 310 is diffracted by grating 2 (312); it then passes through a focusing lens 314 that focuses the light on the detection slit 316. The width of the detection slit 316 can be changed, as needed. Light after the detection slit 316 is collimated by the collimation lens 318 and is directed to grating 3 (320), then to the camera lens 322 and to the camera 324. As evident from FIG. 3, the orientation of grating 3 (320) is different from the corresponding grating 3 (220) in FIG. 2. In this configuration, grating 2 (312) and grating 3 (320) are configured in such a way that the particular pixel of the camera 324 is conjugate to a single point on the sample 308. Therefore, the overall confocal PSF becomes narrow along the lateral direction, as illustrated in FIG. 3. This can be achieved by rotating grating 3 (320) from its orientation in FIG. 2 such that the angle of incidence of light impinging on grating 2 (312) and the angle at which light exits grating 3 (320) are the same for each wavelength. As noted earlier, achieving a high lateral resolution is of importance in confocal imaging and the embodiments of the disclosed technology are better poised to achieve that goal. Similar to the configuration of FIG. 2, solid, dashed and dashed-dotted lines in FIG. 3 represent the blue, the green and the red light rays, respectively.

Figure 4:
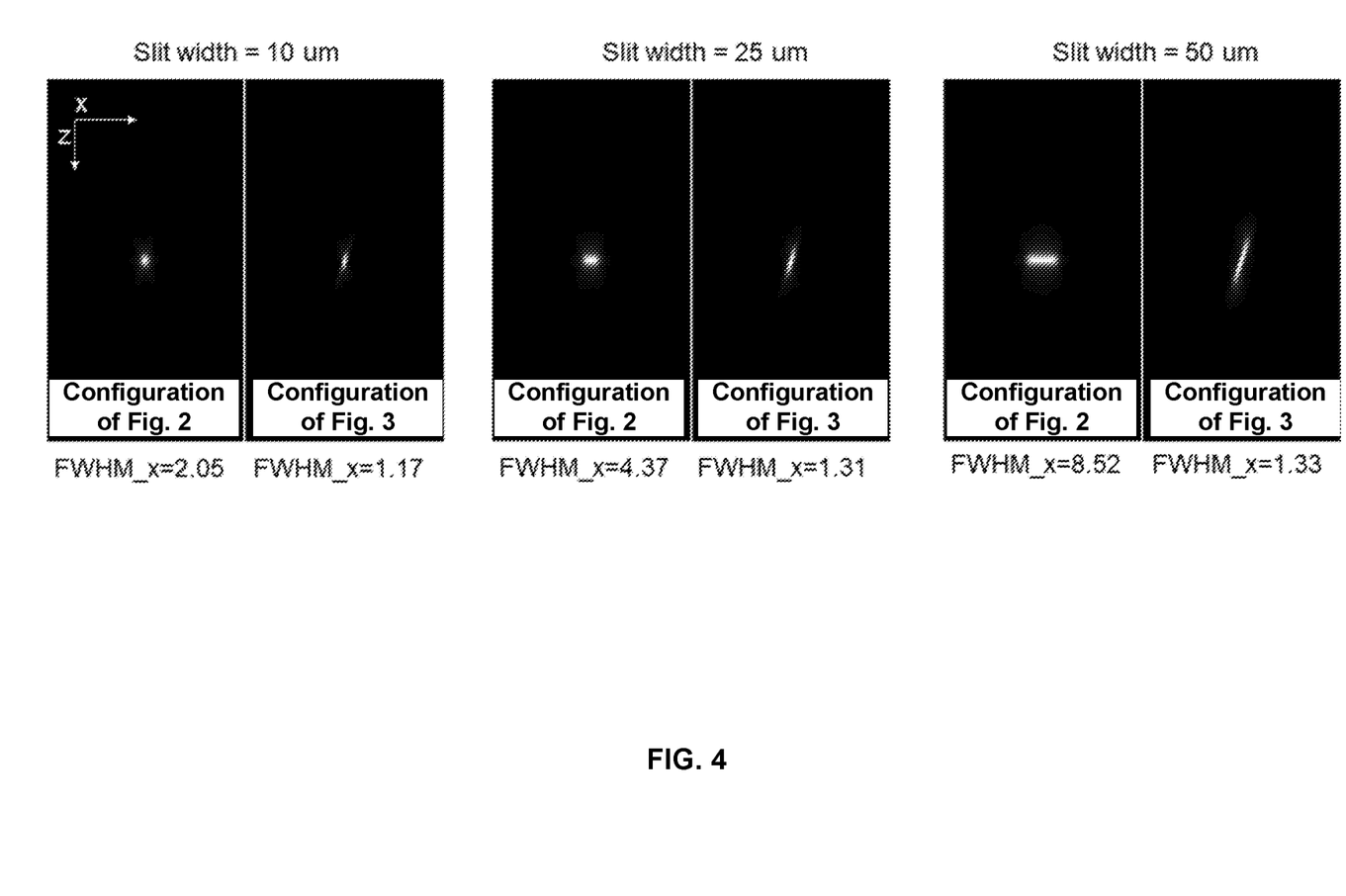
FIG. 4 illustrates an example series of simulated images comparing the lateral resolutions obtained using configurations in FIGS. 2 and 3 for different detection slit widths.

FIG. 4 shows an example series of simulated images comparing the lateral resolutions obtained using configurations similar to those in FIGS. 2 and 3 for different detection slit widths. The following values were selected to produce the images in FIG. 4: central wavelength of 840 nm, illumination numerical aperture (NA) of 0.28, detection NA of 0.35, nominal illumination angle of 21.37°, nominal detection angle of 18.70°, objective focal length of 5 mm (air), and focusing lens focal length of 30 mm. With configurations similar to FIG. 2, the lateral resolution degrades significantly as the detection slit width increases, from 2.05 µm to 4.37 µm to 8.52 µm for the slit widths of 10 µm, 25 µm, and 50 µm, respectively. In contract, using configurations similar to FIG. 3, the lateral resolution degradation is relatively small, from 1.17 µm to 1.31 µm to 1.33 µm for the slit widths of 10 µm, 25 µm, and 50 µm, respectively. In this example, the lateral resolution is maintained to within less than 14% for a 400% change in the slit width. In confocal microscopy, a wider slit width can be advantageously used to 1) increase the signal amount and 2) reduce the speckle noise. The embodiments of the disclosed technology can be implemented in systems, devices and methods to maintain the high lateral resolution while allowing for wider slit widths.

Figure 5A:
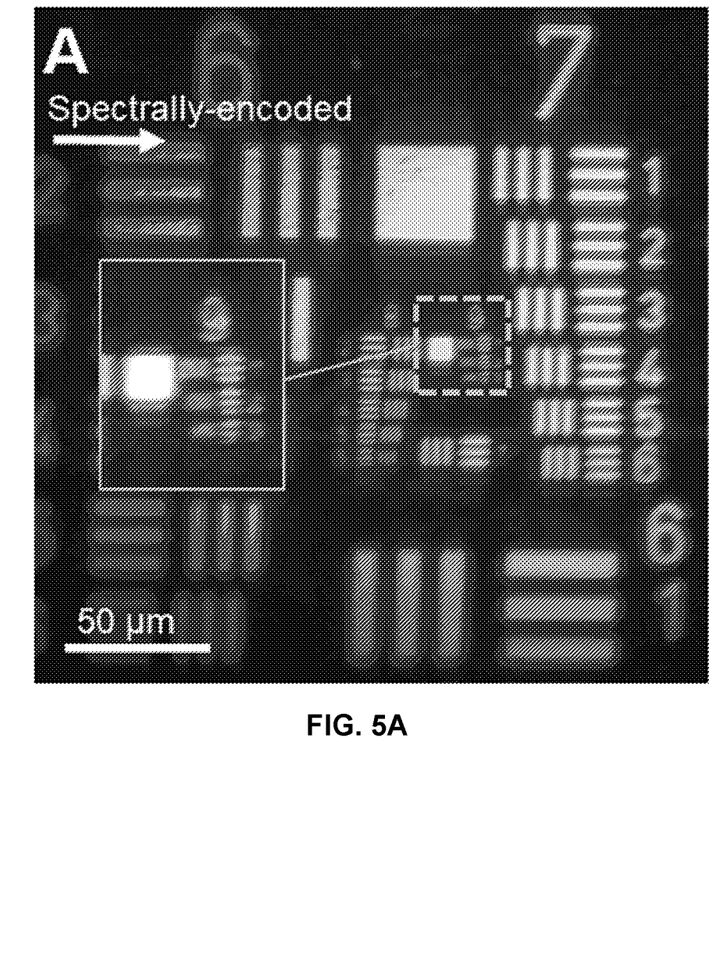
FIG. 5A illustrates a set of example confocal images of a USAF resolution target obtained with a confocal microscope similar to FIG. 2.
Figure 5B:
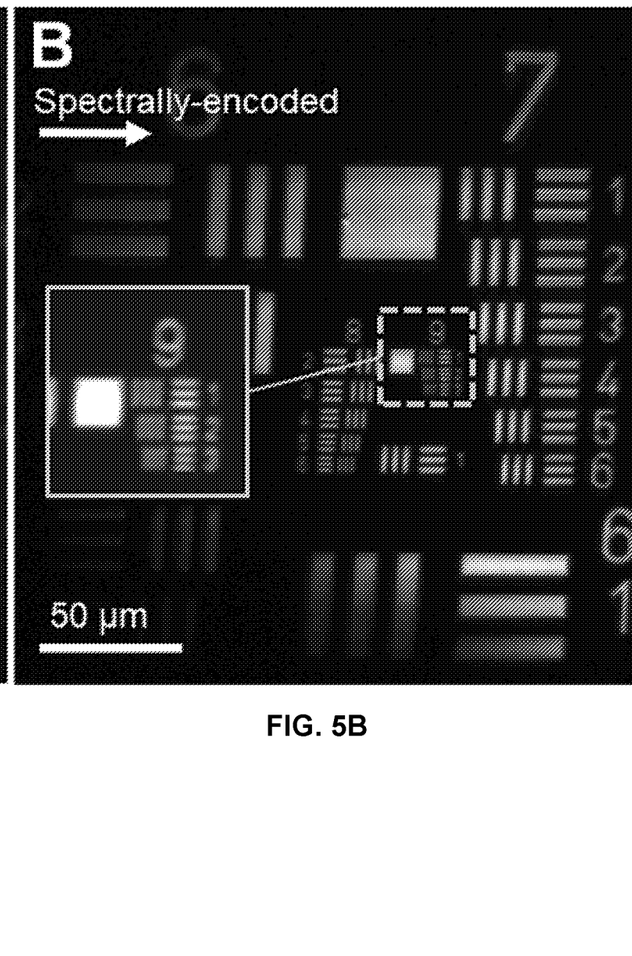
FIG. 5B illustrates a set of example confocal images of a USAF resolution target obtained with a confocal microscope similar to FIG. 3.

FIG. 5A shows a set of example confocal images of the USAF resolution target obtained with a confocal microscope based on a microscope configuration similar to FIG. 2. FIG. 5B shows a set of example confocal images of the USAF resolution target obtained with a confocal microscope based on a microscope configuration similar to FIG. 3. In generating the images in FIG. 5A, the central wavelength of 590 nm and detection slit width of 10 µm were used. In generating the images in FIG. 5B, the central wavelength of 840 nm and detection slit width of 50 µm were used. Even though in FIG. 5B a longer wavelength and a wider slit width were used (thus expecting an inferior resolution due to the diffraction limit), the images in FIG. 5B show that finer line patterns can be imaged compared to FIG. 5A. The measured lateral resolutions were 2.3 µm and 1.3 µm for the FIGS. 5A and 5B, respectively.

As noted earlier, by the way of example and not limitation, in some of the disclosed figures, certain optical rays have been identified as red, green and blue to illustrate the path of dispersed rays through the optical systems. It is, however, understood that the disclosed embodiments can operate using different light sources having different spectral characteristics. Moreover, the various dispersion elements are illustrated as diffraction gratings. In some embodiments, however, prisms can be used.

Among other applications, the disclosed confocal microscopes can visualize cellular features associates with human diseases, such as skin cancers and other dermatologic conditions, and can be used for imaging fresh human tissue for intraoperative treatment guidance.

One aspect of the disclosed embodiments relates to a scan-less confocal microscope that includes a first dispersion element positioned to receive a light beam and to produce output beams having different spectral components for illumination of a target, and an objective lens positioned to receive reflected light from the target upon reflection of the output beams from the target. The scan-less confocal microscope further includes a second dispersion element positioned to receive the reflected light after propagation through the objective lens, and a third dispersion element positioned to receive the dispersed light associated with the second dispersion element and to provide an output light to a camera lens for focusing onto a detector. In this scan-less confocal microscope, the second and the third dispersion elements are positioned such that each point on the detector is a conjugate to a single point on the target.

In some embodiments, for each spectral component of light, an angle of light entering the second dispersion element is equal to a corresponding angle of light that exits the third dispersion element. In one example embodiment, the light exiting the third dispersion element is collimated light. In another example embodiment, a detection slit is positioned between the second and the third dispersion elements. In some example embodiments, a width of the detection slit is changeable. In one example embodiment, a focusing lens is positioned between the second dispersion element and the detection slit, and a collimation lens is positioned between the detection slit and the third dispersion element.

According to example embodiments, the second dispersion element and the third dispersion element are positioned to produce a detection point spread function (PSF) having an elongated dimension that is not parallel to a lateral direction of the target. In some example embodiments, the second dispersion element and the third dispersion element are positioned to change a direction of the light incident thereupon by the same degree and in the same direction. In another example embodiment, each of the first, the second and the third dispersion elements is a diffraction grating. In some example embodiments, the target is a biological tissue. In another example embodiment, the detector includes a plurality of pixels. In yet another example embodiment, the confocal microscope further includes a light source configured to produce the light beam to the first dispersion element. For example, the light source can be a white light source.

Another aspect of the disclosed embodiments to a detection system in a confocal microscope, where the detection system includes an objective lens positioned to receive reflected light from a target that is illuminated with light having a plurality of spectral components. The detection system of the confocal microscope includes a first dispersion element positioned to receive the reflected light after propagation through the objective lens, and a second dispersion element positioned to receive the dispersed light output from the first dispersion element and to provide an output light to a camera lens for focusing onto a detector. The first and the second dispersion elements are positioned such that each point on the detector is conjugate to a corresponding single point on the target. For each spectral component of light, an angle of light entering the first dispersion element is equal to a corresponding angle of light that exits the second dispersion element. In one embodiment, the light exiting the second dispersion element is collimated light. In another embodiment, the detection system further includes a detection slit positioned between the first and the second dispersion elements, a focusing lens positioned between the first dispersion element and the detection slit, and a collimation lens positioned between the detection slit and the second dispersion element. For example, the first dispersion element and the second dispersion element are positioned to produce a detection point spread function (PSF) having an elongated dimension that is not parallel to a lateral direction of the target. The first dispersion element and the second dispersion element of the detection system are positioned to change a direction of the light incident thereupon by the same angle and in the same direction. The detection system can include the camera lens and the detector, wherein the detector includes a plurality of pixels.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. While operations are depicted in the drawings in a particular order, this should not be understood as requiring that such operations be performed in the particular order shown or in sequential order, or that all illustrated operations be performed, to achieve desirable results. The features of the embodiments described herein may be combined in all possible combinations of methods, apparatus, modules, and systems.

What is claimed is:

1. A confocal microscope, comprising:
    a first dispersion element positioned to receive a light beam and to produce illumination beams having different spectral components for illumination of a target;
    an objective lens positioned to receive reflected light from the target upon reflection of the illumination beams from the target;
    a second dispersion element positioned to receive the reflected light after propagation through the objective lens; and
    a third dispersion element positioned to receive the dispersed light associated with the second dispersion element and to provide an output light to a camera lens for focusing onto a detector, wherein
    the second and the third dispersion elements are positioned such that each point on the detector is conjugate to a corresponding single point on the target.

2. The confocal microscope of claim 1, wherein for each spectral component of light, an angle of the light entering the second dispersion element is equal to a corresponding angle of light that exits the third dispersion element.

3. The confocal microscope of claim 1, wherein the light exiting the third dispersion element is collimated light.

4. The confocal microscope of the claim 1, further including a detection slit positioned between the second and the third dispersion elements.

5. The confocal microscope of the claim 4, wherein a width of the detection slit is changeable.

6. The confocal microscope of claim 4, further comprising:
    a focusing lens positioned between the second dispersion element and the detection slit, and
    a collimation lens positioned between the detection slit and the third dispersion element.

7. The confocal microscope of claim 1, wherein the second dispersion element and the third dispersion element are positioned to produce a detection point spread function (PSF) having an elongated dimension that is not parallel to a lateral direction of the target.

8. The confocal microscope of claim 1, wherein the second dispersion element is positioned to change a direction of the light incident thereupon by a first angle and in a first direction, and the third dispersion element is positioned to change a direction of the light incident thereupon by a second angle and in a second direction, wherein the first angle is equal to the second angle, and the first direction is equal to the second direction.

9. The confocal microscope of claim 1, wherein each of the first, the second and the third dispersion elements is a diffraction grating.

10. The confocal microscope of claim 1, wherein the target is a biological tissue.

11. The confocal microscope of claim 1, wherein the detector includes a plurality of pixels.

12. The confocal microscope of claim 1, further comprising a light source configured to produce the light beam received by the first dispersion element.

13. The confocal microscope of claim 12, wherein the light source is a white light source.

14. A detection system in a confocal microscope, the detection system comprising:
an objective lens positioned to receive reflected light from a target that is illuminated with light having a plurality of spectral components;
a first dispersion element positioned to receive the reflected light after propagation through the objective lens; and
a second dispersion element positioned to receive the dispersed light output from the first dispersion element and to provide an output light to a camera lens for focusing onto a detector, wherein
the first and the second dispersion elements are positioned such that each point on the detector is conjugate to a corresponding single point on the target, wherein the first dispersion element and the second dispersion element are positioned to produce a detection point spread function (PSF) having an elongated dimension that is not parallel to a lateral direction of the target.

15. The detection system of claim 14, wherein for each spectral component of light, an angle of light entering the first dispersion element is equal to a corresponding angle of light that exits the second dispersion element.

16. The detection system of claim 14, wherein the light exiting the second dispersion element is collimated light.

17. The detection system of claim 14, further including:
a detection slit positioned between the first and the second dispersion elements,
a focusing lens positioned between the first dispersion element and the detection slit, and
a collimation lens positioned between the detection slit and the second dispersion element.

18. The detection system of claim 14, wherein the first dispersion element is positioned to change a direction of the light incident thereupon by a first angle and in a first direction, and the second dispersion element is positioned to change a direction of the light incident thereupon by a second angle and in a second direction, wherein the first angle is equal to the second angle, and the first direction is equal to the second direction.

19. The detection system of claim 14, comprising the camera lens and the detector, wherein the detector includes a plurality of pixels.

20. The detection system of claim 19, wherein the detector and the camera lens are part of an external device.

21. The detection system of claim 20, wherein the external device is a smart phone or a tablet device.

* * * * *